March 8, 1966  E. E. MUELLER ETAL  3,239,278
APPARATUS FOR INJECTING BULK SOLIDS INTO A VESSEL
Filed April 13, 1964
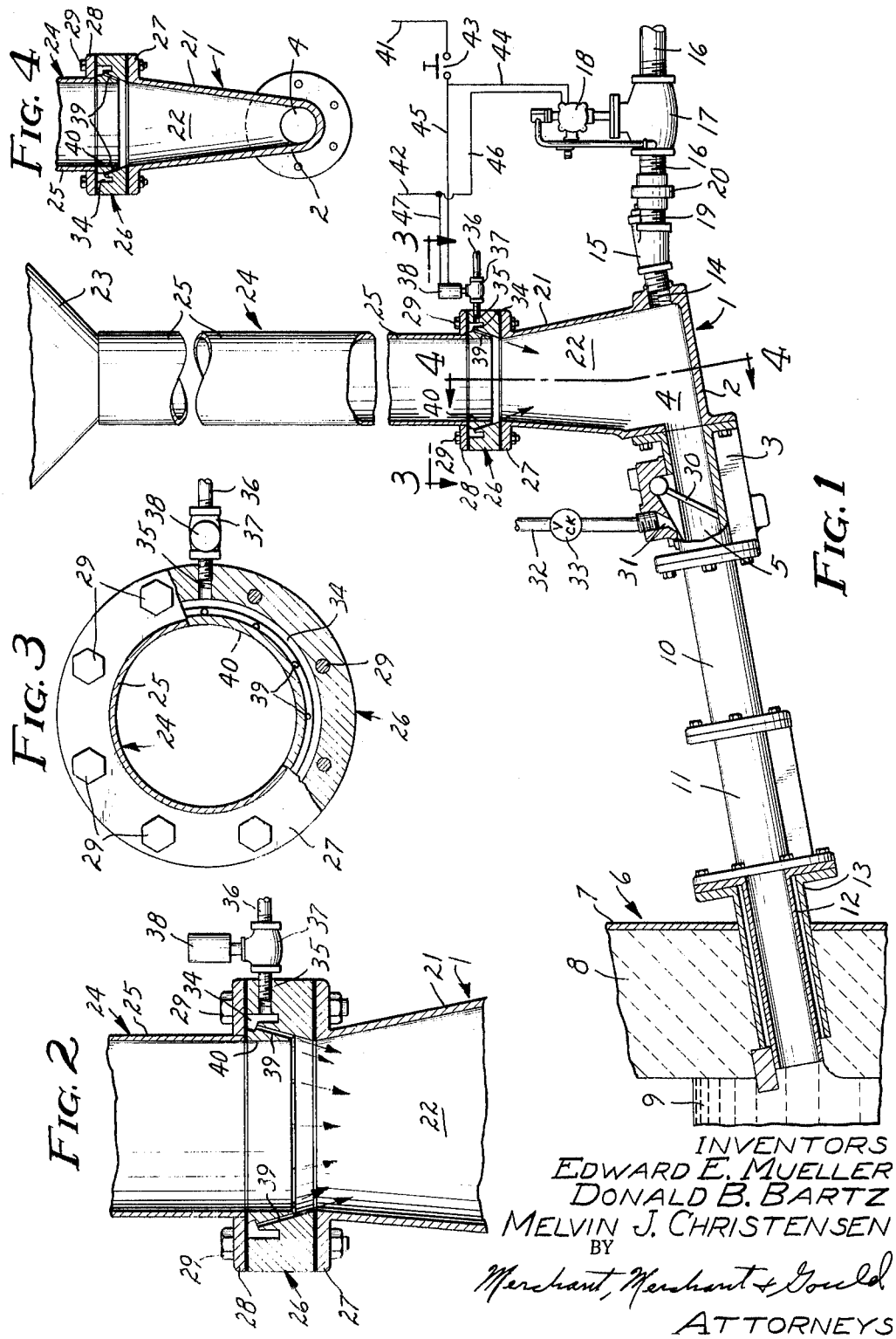
INVENTORS
EDWARD E. MUELLER
DONALD B. BARTZ
MELVIN J. CHRISTENSEN
BY
Merchant, Merchant & Gould
ATTORNEYS 3,239,278
APPARATUS FOR INJECTING BULK SOLIDS
INTO A VESSEL
Edward E. Mueller, Excelsior, Donald B. Bartz, St. Paul, and Melvin J. Christensen, Fridley, Minn., assignors to Whirl-Air-Flow Corporation, Minneapolis, Minn., a corporation of Illinois
Filed Apr. 13, 1964, Ser. No. 359,282
4 Claims. (Cl. 302—51)

This invention relates generally to apparatus for injecting bulk solids into vessels or containers for mixing with other materials being processed in such vessel.

More particularly, this invention is in the nature of an improvement on structures of the type disclosed in the United States Letters Patent to Rexroth, 2,784,037, and involves means defining a material receiving chamber having a material outlet at one end portion for connection to a vessel to be supplied with bulk solids, a gas inlet at its other end portion for material propellent gas under pressure, and a material receiving inlet intermediate said outlet and gas inlet; and conduit means for delivery of bulk solids from a source of supply to said chamber.

Heretofore, in devices of this kind, different valve arrangements have been used to control the flow of bulk solids to the material receiving chamber, otherwise known as a charging chamber. When the bulk solids to be injected are in the nature of finely divided granular or powdered material, difficulty has been experienced in providing valves which operate freely and which do not become clogged with the material. Hence, an important object of this invention is the provision of an injecting apparatus which eliminates the necessity of valves in the material inlet or in the supply conduit for the bulk solids.

Another object of this invention is the provision of material injecting apparatus as set forth, having novel means for preventing escape of propelling gas outwardly through the material inlet of the charge-receiving chamber.

Yet another object of this invention is the provision of material injecting apparatus in which bulk solids are delivered to the charging chamber during injection of said solids to a vessel or container, whereby to permit the use of a smaller charging chamber than would be otherwise required for a given charge of said solids.

Still another object of this invention is the provision of injecting apparatus which insures adequate flow of bulk solids to the charge-receiving chamber.

Other objects of this invention include the provision of injecting apparatus which is relatively simple and inexpensive to produce, which has a minimum of moving parts, which is highly efficient in operation, and which is rugged in construction and durable in use.

The above, and still further highly important objects and advantages of this invention will become apparent from the following detailed specification, appended claims and attached drawings.

Referring to the drawings, which illustrate the invention, and in which like reference characters indicate like parts throughout the several views:

FIG. 1 is a fragmentary view partly in side elevation and partly diagrammatic, of an injecting apparatus produced in accordance with this invention, some parts being broken away and some parts being shown in section;

FIG. 2 is a view corresponding to a portion of FIG. 1 on an enlarged scale;

FIG. 3 is an enlarged horizontal section taken substantially on the line 3—3 in FIG. 1, some parts being broken away, and FIG. 4 is a fragmentary section taken on the line 4—4 of FIG. 1.

In the preferred embodiment of the invention illustrated, a body or housing 1 is shown as comprising a pair of body sections 2 and 3 which cooperate to define a charge-receiving chamber 4. The body section 3 defines an outlet 5 which communicates with the interior of a vessel shown fragmentarily in FIG. 1 and indicated generally by the reference character 6. For the purpose of the present example, the vessel 6 is in the nature of a conventional foundry cupola, which includes an outer metallic shell 7 and a lining 8 of refractory material, the cupola 6 containing molten material 9, such as iron or steel. Cupolas being well known in the art, and the vessel 6 in and of itself not comprising the instant invention, further detailed showing and description thereof is omitted in the interest of brevity. However, it will be appreciated that the vessel 6 may be a container for mixing of different materials whether in dry or liquid form, and that the injecting apparatus of this invention is adapted for use therewith as well as with a foundry cupola. The housing section 3 is connected to the vessel 6 by means of tubular delivery conduits or pipes 10 and 11, and an injector tube 12 contained within a protective tubular mounting member 13 that extends through the outer shell 7 and at least partially through the refractory lining 8.

At its end opposite the outlet 5, the body or housing 1 has a gas inlet opening 14 that is aligned with the outlet 5 and to which is connected, by means of a suitable fitting 15, a gas conduit or pipe 16 that may be assumed to be connected to a suitable pressure source, not shown. A normally closed valve 17 is interposed in the pipe 16 and operated by a solenoid 18, the valve 17 and solenoid 18 being of conventional and well-known structure. The pipe 16 is connected to the fitting 15 in the usual manner by a nipple 19 and a pipe union 20.

The body or housing section 2 is formed to provide an upwardly extending neck 21 which defines a material inlet 22 for delivery of bulk solids to the chamber 4 intermediate the gas inlet opening 14 and the outlet 5. Bulk solids are delivered to the inlet opening 22 from a supply hopper 23 through a material delivery conduit 24 comprising an elongated generally vertically disposed conduit section 25 and a relatively short conduit section 26 interposed between the lower end of the conduit section 25 and the upper flanged end 27 of the neck 21. The lower end of the conduit section 25 is provided with an anchoring flange 28 which overlies the conduit section 26, the conduit 24 being rigidly secured to the body section by nut-equipped bolts or the like 29 extending through the flanges 27 and 28 and the conduit section 26. The conduit sections 25 and 26 and neck 21, being axially aligned and substantially vertically disposed, allow for an elongated column of bulk solids extending from the supply hopper 23 to the charge-receiving chamber 4. A check valve 30 in the housing section 3 is yieldingly urged by gravity or otherwise toward a closed position shown in FIG. 1 to prevent accidental flow of bulk solids from the chamber 4 downwardly through the sloping tube sections 10 and 11 and into the vessel 6 during nonoperating periods of the injecting apparatus, such as when the valve 17 is closed.

Between the check valve 30 and the outlet 5, the body section 3 is provided with a gas inlet opening 31 to which is fitted a supply pipe 32 having a check valve 33 interposed therein. The supply pipe 32 is adapted to be connected to a suitable source, not shown, of pressurized gas, such as air, for the purpose of maintaining the tubes 10, 11 and 12 under sufficient pressure, during inactive periods to prevent the molten metal 9 from flowing into the injector tube 12 and other tubes 10 and 11. Preferably, the pressure of gas delivered to the apparatus through the pipe 32 is substantially less than the pressure of the material propelling gas delivered by the gas conduit or pipe 16. As above mentioned, pressure of the gas in the pipe 32 is only sufficient to prevent the molten material 9 from entering the injector tube 12, pressure in the pipe 16 being considerably higher to enable the same to convey the bulk solids in the chamber 4 against the check valve 30 to open the same, and thereafter convey the bulk charge through the tubes 10–12 to the interior of the vessel 6. Preferably, propelling gas is supplied to the chamber 4 through the pipe 16 at pressures in the neighborhood of 80 pounds per sq. inch or more, while gas is introduced to the outlet portion 5 and tubes 10–12 through the pipe 32 at pressures anywhere between approximately 2 and 15 pounds per square inch as required.

The annular material delivery conduit section 26 is formed to provide an annular chamber 34 having an inlet 35 to which is connected a gas conduit or pipe 36 in which is interposed a valve 37 that is operated by a conventional solenoid 38. A plurality of circumferentially spaced gas passages extend angularly inwardly and downwardly from the annular chamber 34 to the radially inner circumferential wall surface 40 of the annular conduit section 26 to direct gas downwardly through the inlet 22 to the charge-receiving chamber 4. Preferably, the conduit or pipe 36 is connected to the same source of supply as the propellent gas conduit 16, the air or gas being introduced to the inlet 22 from the passages 39 being at the same pressure as that which enters the gas inlet 14.

Preferably, the valves 17 and 37 are opened substantially simultaneously and likewise closed substantially simultaneously by energization and deenergization of their respective solenoids 18 and 38. For the purpose of the present example, the solenoids 18 and 38 are shown diagrammatically as connected in parallel circuits comprising a pair of power leads 41 and 42, the former thereof being connected to the solenoids 18 and 38 by branch leads 44 and 45 respectively. The power lead 42 is connected to the solenoids 18 and 38 by branch leads 46 and 47 respectively. Thus, assuming that the material delivery conduit 24 and charge-receiving chamber 4 are filled with bulk solids to be injected into the vessel 6, closing of the switch 43 will cause the valves 17 and 37 to be simultaneously opened by energization of their respective solenoids 18 and 38, admitting a blast of propelling gas to the chamber 4 through the inlet 14, and admitting jets of gas through the passages 39, through the inlet 22 and downwardly toward the chamber 4, for as long as the switch 43 is closed. Thus, material from the chamber 4 is injected into the vessel 6 by air pressure.

Gas moving inwardly and downwardly through the passages 39 and into the inlet 22 serves a plurality of functions. Being introduced to the inlet at the same pressure as the propelling gas entering through the gas inlet 14, downward pressure of gas in the inlet 22 prevents upward flow of gas from the inlet 14 through the column of material within the delivery conduit 24. Further, the downward blast of gas through the passages 39 aerate the bulk solids within the inlet portion 22 and pneumatically feed the bulk solids downwardly toward the charge-receiving chamber portion 4, continuing to feed material thereto until the valves 17 and 37 are closed. With this arrangement, the quantity of bulk solids delivered to the vessel 6 at any given injection is determined by the length of time during which the valves 17 and 37 are open. The valves 17 and 37 being normally closed, opening of the switch 43 will deenergize the solenoids 18 and 38 and permit their respective valves 17 and 37 to close in the usual and well-known manner. It will be noted that, as soon as the valves 17 and 37 are closed, downward movement of bulk solids through the conduit 24 will cease, due to closing of the check valve 30 through the action of gravity or other suitable means including relatively low pressure in the outlet portion 5, supplied through the pipe 32 and inlet 31.

It will be appreciated that the solenoids 18 and 38 may be automatically controlled with the use of well-known timing devices to cause opening and closing of the valves 17 and 38 at predetermined time intervals, if desired. The provision of the downward flow of gas from the gas passages 39 eliminates the necessity for valve structure in the material delivery conduit 24, and permits the use of a smaller charge-receiving chamber than heretofore required, inasmuch as the quantity of material being injected for a given charge thereof is determined by the time interval during which the valves 17 and 37 are open.

This invention has been thoroughly tested and found to be completely satisfactory for the accomplishment of the objectives set forth; and while we have shown and described one embodiment of our injecting apparatus, it will be understood that the same is capable of modification without departure from the spirit and scope of the invention, as defined in the claims.

What we claim is:

1. In an apparatus for injecting bulk solids into a vessel:
   (a) means defining a charge-receiving chamber having an outlet at one end portion for connection with a vessel and having a gas inlet at its other end portion,
   (b) a tubular material delivery conduit for delivery of bulk solids from a source thereof to said chamber intermediate said inlet and outlet,
   (c) said conduit having a portion defining gas passage means directed angularly inwardly to the interior of said material delivery conduit and generally longitudinally of said material delivery conduit toward said chamber,
   (d) conduit means including a pair of gas conduits for connection to a source of gas under pressure, one thereof being connected to said gas inlet and the other thereof to said gas passage means,
   (e) a pair of valves, one in each of said gas conduits,
   (f) and means for opening said valves substantially simultaneously.

2. The structure defined in claim 1 in which said conduit portion comprises an annular member having a radially inner circumferential wall surface and defining an annular chamber communicating with said conduit means, said gas passage means comprising a plurality of circumferentially spaced passages extending from said chamber to said radially inner circumferential wall surface, said passages converging toward said charge-receiving chamber.

3. In an apparatus for injecting bulk soldis into a vessel:
   (a) body means defining a charge-receiving chamber having an outlet at one end portion for communication with a vessel, a gas inlet at its other end portion, and an upwardly opening material inlet intermediate said outlet and said gas inlet,
   (b) a generally vertically extending tubular material delivery conduit for delivery of bulk solids to said material receiving chamber through said material inlet and adapted to contain a column of said bulk solids,
   (c) means operatively associated with said conduit defining a plurality of circumferentially-spaced gas passages directed angularly radially inwardly and downwardly toward said chamber,
   (d) conduit means for delivery of propelling gas under pressure to said gas inlet and said gas passages,
   (e) and valve means in said conduit means for admitting said gas under pressure to said gas inlet and gas passages substantially simultaneously.

4. In an apparatus for injecting bulk solids into a vessel:
   (a) body means defining a charge-receiving chamber having an outlet at one end portion for commnication with a vessel, a gas inlet at its other end portion, and an upwardly opening material inlet intermediate said outlet and said gas inlet, (b) a generally vertically extended tubular material delivery conduit for delivery of bulk solids to said material receiving chamber through said material inlet and adapted to contain a column of said bulk solids.

(c) said delivery conduit including an annular conduit section overlying said material inlet and connecting said conduit to said body means, (d) said annular conduit section having an inner diameter substantially equal to the inner diameter of said delivery conduit and defining an annular chamber and a plurality of circumferentially-spaced gas passages extending from said chamber angularly inwardly and downwardly toward said material inlet, (e) conduit means for delivery of propelling gas under pressure to said gas inlet and annular chamber, (f) and valve means in said conduit means for admitting said gas under pressure to said gas inlet and annular chamber substantially simultaneously.

References Cited by the Examiner
UNITED STATES PATENTS

| | | | |
|---|---|---|---|
| 636,279 | 11/1899 | Newhouse | 302—53 |
| 2,784,037 | 3/1957 | Rexroth | 302—36 |
| 2,919,159 | 12/1959 | Lacroix | 302—53 |
| 3,086,823 | 4/1963 | Rexroth | 302—36 |

EVON C. BLUNK, *Primary Examiner.*

ANDRES H. NIELSEN, *Examiner.*